ELECTRICAL SYSTEM

Filed Feb. 15, 1949 2 SHEETS—SHEET 1

INVENTOR.
ROBERT C. MOORE
BY
Brown, Denk & Synnestvedt
AGENTS

ELECTRICAL SYSTEM

Filed Feb. 15, 1949 2 SHEETS—SHEET 2

INVENTOR.
ROBERT C. MOORE
BY
Brown, Denk & Synnestvedt
AGENTS

Patented Aug. 5, 1952 2,606,304

UNITED STATES PATENT OFFICE 2,606,304

ELECTRICAL SYSTEM

Robert C. Moore, Erdenheim, Pa., assignor to Philco Corporation, Philadelphia, Pa., a corporation of Pennsylvania Application February 15, 1949, Serial No. 76,533

6 Claims. (Cl. 315—27)

The present invention relates to cathode ray beam deflection circuits, especially as employed in television receiving systems of the type having a cathode ray image-reproducing tube, and more particularly relates to means for simplifying such circuits and increasing their efficiency by minimizing the energy losses therein.

Television receiving systems utilizing the principle of electromagnetic deflection of a cathode ray scanning beam customarily include at least one power output tube which is adapted to deliver cyclically varying current through a coupling transformer to a pair of low-impedance cathode ray beam deflection coils encircling the neck of an image-reproducing cathode ray tube. The coupling transformer is normally arranged so that its primary winding lies in the anode-cathode circuit of the power output tube, with its secondary winding connected across the deflection coils. In this manner, the transformer serves to match the relatively high impedance of the power output tube (customarily a pentode) to the lower impedance of the deflection coils.

In one form of known deflection coil structure, a pair of coil windings are positioned on oppositely-disposed sections of a unitary core element. These windings are series-connected in such a manner that the respective magnetic fields produced thereby reinforce one another in an opening in the core through which the neck of the cathode ray tube passes. By causing a linearly varying current from the coupling transformer to flow through the coil windings during the useful portion of each deflection cycle, a substantially linear deflection of the cathode ray beam is brought about.

It is recognized, however, that the use of a transformer to couple a power output tube to the deflection coils results in a considerable transfer loss of energy in the transformer. This loss may be as high as 40% in commercial embodiments. In addition, the employment of a coupling transformer adds materially to the overall cost of the equipment. It has accordingly been proposed to eliminate the coupling transformer from cathode ray beam deflection circuits by connecting the deflection coils in the anode-cathode circuit of the power output tube. The tube current would then flow directly through the coils, and the energy transfer loss due to the coupling transformer would no longer be present. However, the sawtooth current flowing through the deflection coils in many such arrangements contains a direct current component which sets up a steady flux between the coils. The effect of this is to produce an initial deviation, or biasing, of the cathode ray beam from the tube axis unless a neutralizing, or compensating, field is provided. Furthermore, since the impedance of the deflection coils should preferably match the impedance of the power output tube, and since the latter is customarily high, it has heretofore been considered necessary to employ a balanced high-impedance pair of windings in such designs. Due to the high voltages produced across such high-impedance coils, the problem of insulation in deflection units of standard circular design has been a factor in limiting the extent of their use. Furthermore, high-impedance windings are relatively expensive, and in addition the amount of distributed capacity in the circuit may be raised to a point where the time interval in each deflection cycle that is allotted for the retrace, or snap-back, action of the cathode ray scanning beam is exceeded.

One object of the present invention, therefore, is to provide an improved form of cathode ray beam deflection circuit in which the usual coupling transformer may be omitted without raising to a material degree the distributed capacity in the circuit.

Another object of the present invention is to provide a cathode ray beam deflection circuit in which the energy losses are held to a minimum.

A still further object of the invention is to provide a combined coupling transformer and deflection yoke in which an initial off-center biasing of the cathode ray beam is overcome.

An additional object of the present invention is to provide a cathode ray beam deflection circuit of the nature set forth, and which further includes means for recovering a portion of the cyclic reactive energy developed during the retrace interval, and utilizing this energy to bring about an increase in scanning power.

Other objects and advantages will be apparent from the following description of several forms of the invention and from the drawings, in which.

In Figs. 1 through 4 is shown an embodiment of the present invention in which the coupling transformer in a cathode ray beam deflection circuit is effectively combined with the deflection coils to form a unitary assembly in which the usual disadvantages of such an arrangement are overcome. The horizontal deflection components of the assembly, which will be considered first, include a high-impedance coil $L_1$ which is wound on one leg 10 of a laminated core structure 12. The latter is preferably of rectangular configuration as shown, and is designed to have a relatively small cross-sectional area for reasons which will later become apparent.

Figure 3:
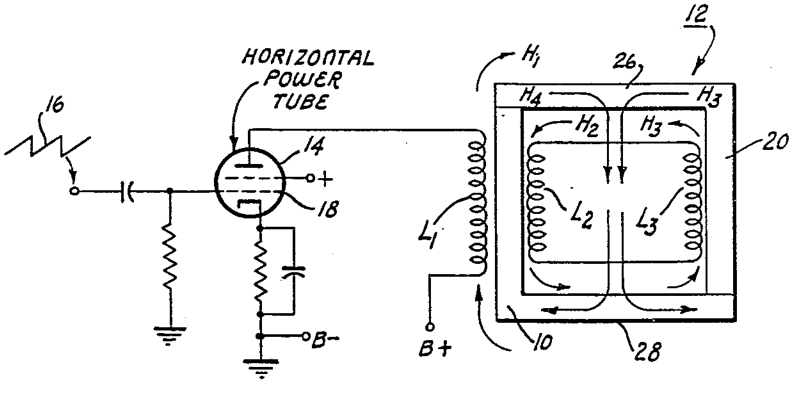
Fig. 3 illustrates one form of circuit arrangement for energizing the horizontal, or line, deflection elements of the assembly of Fig. 2.

The coil $L_1$ is connected in the anode-cathode circuit of a horizontal power tube 14 (see Fig. 3). Tube 14 is adapted to provide a flow of current of sawtooth waveform through coil $L_1$ when voltage variations 16, also of sawtooth waveform, are applied to the control electrode 18 thereof. This flow of sawtooth current through coil $L_1$ sets up an electromagnetic field around the core leg 10 as generally indicated in Fig. 3 by the arrow $H_1$.

Figures 1, 2:
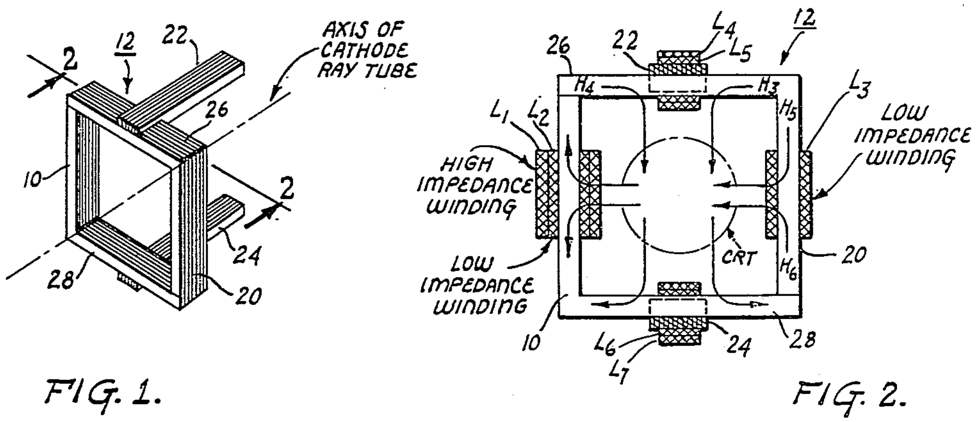
Fig. 1 is a perspective view of a core element particularly adapted for use in connection with one type of combined coupling transformer and deflection yoke in accordance with the present invention.
Fig. 2 is a cross-sectional view of Fig. 1 along the line 2—2 and further showing the various coil windings in position.

A further coil $L_2$, of relatively low impedance, is wound on the same leg 10 of the core 12 that carries the high-impedance coil $L_1$. When a current flows in coil $L_2$ as a result of the voltage induced across it due to the current flow in coil $L_1$, a field is produced (indicated by the arrow labeled $H_2$) which opposes the field $H_1$ of the high-impedance coil $L_1$. A second low-impedance coil $L_3$ is wound on another leg 20 of the core 12, the leg 20 being opposite the core leg 10 which carries the two windings $L_1$ and $L_2$. When the low-impedance coils $L_2$ and $L_3$ are connected together in the manner shown in Fig. 3, the current flowing in coil $L_2$ will also flow through coil $L_3$ to produce a magnetic field $H_3$ around the core leg 20. By properly relating the ampere-turns of the coils $L_2$ and $L_3$ both to one another and to the ampere-turns of the high-impedance coil $L_1$, the field $H_3$ may be made equal to the resultant field $H_4$ produced by the combined action of fields $H_1$ and $H_2$, and the general direction of these fields $H_3$ and $H_4$ around the core leg sections 10 and 20 will be as shown in Figs. 2 and 3. It will be seen that, since the fields reinforce one another in the opening in the core through which the neck of the cathode ray tube passes (Fig. 2), the resulting flux will be suitable to serve as the horizontal, or line, deflecting field for the cathode ray beam developed in such tube. The coil relationship which should exist to secure an ideal deflecting field is given by the equation $$\sqrt{\frac{L_2}{L_3}}=\frac{-(2k_3-k_1-k_2)\pm\sqrt{(2k_3-k_1-k_2)^2-4(1-k_1)(1-k_2)}}{2(1-k_1)}\cong$$

$$\frac{1-k_2}{k_1-k_2}\text{ for }(1-k_1)\ll(1-k_2)=(1-k_3)$$

where $k_1$ is the coupling coefficient of $L_1$ to $L_2$, $k_2$ is the coupling coefficient of $L_1$ to $L^3$, and $k_3$ is the coupling coefficient of $L_2$ to $L_3$.

As a result of the above arrangement, not only is the horizontal coupling transformer dispensed with, but also a part of the reactive power losses inherent in transformer action. Any magnetic fields in a separate transformer or choke are useless for direct deflection since they do not exist across the tube neck. In Figs. 1–4, however, the flux in the core returns in large measure across the air gap through which the tube neck passes. In other words, that flux which exists in the core because of imperfect coupling between primary and secondary windings is wasted in the case of the separate transformer, while it is part of the useful deflecting field in applicant's structure. Moreover, the steady flux produced by the D.-C. component in the current output of tube 14 (which passes through the coil $L_1$) travels almost exclusively in the closed iron path including legs 10 and 20, and not in the opening through which the cathode ray tube passes. Thus the initial off-center biasing of the cathode ray beam which exists in many known circuits is materially reduced in magnitude.

The core structure 12 should have as small a cross-section as possible without decreasing to a noticeable extent the strength of the fields produced by the coils $L_1$, $L_2$ and $L_3$. The reason for this is that the distributed capacity of the assembly varies in direct relation to the cross-sectional area of the core. Hence, by utilizing a core of small cross-section, it is possible to avoid an undesirable increase in that time interval, in the deflection cycle, which is allotted for the retrace action of the cathode ray scanning beam.

However, it may be found that the use of a core having a small cross-sectional area may limit the region within which the horizontal deflecting field is effective to such an extent that the desired size of the image raster cannot be attained. To preclude such a possibility, the embodiment of the present invention shown in Figs. 1 through 4 includes means for extending the horizontal deflecting field axially of the cathode ray tube by means of a pair of so-called ears 22 and 24 which are respectively mounted on the two remaining legs 26 and 28 of the core element 12. As best shown in Fig. 1, the ear 22 is laminated in the same fashion as the core element itself, and is secured in any suitable manner to the mid-portion of the leg 26. In a similar manner, the ear 24 is secured to the mid-portion of the leg 28, the two legs 26 and 28 being disposed in substantially parallel relation and lying as shown on opposite sides of the axis of the cathode ray tube when the latter is in position. It should be noted that the assembly of Figs. 1 and 2 should so encircle the neck of the cathode ray tube that the ears 22 and 24 extend in a direction toward the electron gun. The action of these ears 22 and 24 is such that they may be said to provide the magnetic equivalent of a pair of electrostatic deflection plates.

Considering now the vertical deflection components of the assembly of Figs. 1 through 4, it will be seen from Fig. 2 that two coils $L_4$ and $L_5$ are wound on the ear 22. These coils $L_4$ and $L_5$ have their turns lying parallel to the axis of the cathode ray tube, and also parallel to the direction of the laminations of the ear 22. In a similar manner, two further coils $L_6$ and $L_7$ are wound on the ear 24. When a sawtooth current is caused to flow through each of these pairs of coils in a manner to be later described, the flux produced thereby will cross the neck of the cathode ray tube in a substantially horizontal direction, as generally shown by the arrows $H_5$ and $H_6$ in Fig. 2, and thus will serve as the vertical deflecting field for the cathode ray beam of the tube.

Figure 4:
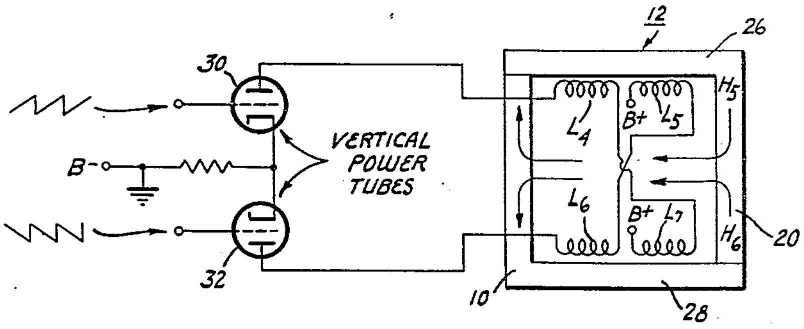
Fig. 4 illustrates one form of circuit for energizing the vertical, or field, deflection elements of the arrangement of Fig. 2.

While it is of course possible to employ a single vertical deflection coil on each of the ears 22 and 24 instead of the pair of coils which are illustrated in the embodiment of Figs. 1 through 4, nevertheless the use of such a pair of coils on each of the ears 22 and 24 eliminates the D.-C. component, which would be present in a single coil, and thus overcomes any initial biasing of the cathode ray beam in a vertical direction when the coils $L_4$, $L_5$, $L_6$ and $L_7$ are connected to a source of sawtooth energy such, for example, as that shown in Fig. 4. As shown in this latter figure, the coils $L_4$ and $L_5$ act in effect as a split winding, while the coils $L_6$ and $L_7$ are similarly arranged. By employing a pair of vertical power tubes 30 and 32 in push-pull relation, by connecting the coils $L_4$ and $L_7$ in series in the anode-cathode circuit of one of the tubes, such as 30, and by connecting the coils $L_5$ and $L_6$ in series in the anode-cathode circuit of the remaining tube, then the substantially-fixed fluxes due to the D.-C. components of current in the coils $L_4$ and $L_5$ may be caused to flow in opposite directions in the core by 26 and thus balance out. Likewise, the fluxes due to D.-C. components of current in the coils $L_6$ and $L_7$ will likewise cancel, and only the A.-C. portion of the energy delivered by the vertical power tubes 30 and 32 will remain to produce a deflection of the cathode ray scanning beam. Moreover, substantially all of the A.-C. energy delivered by the tubes 30 and 32 is usefully employed in deflection. This is in marked contradistinction to the action in the usual transformer-coupled circuits where the alternating fluxes in the transformer are a total loss insofar as direct beam deflection is concerned.

Figure 5:
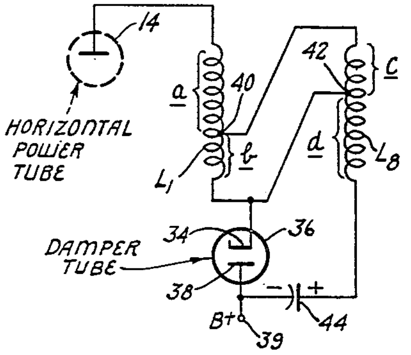
Fig. 5 is a circuit diagram of a modification of the embodiment of the invention illustrated in Figs. 1 through 4, showing the manner in which energy may be recovered from the secondary circuit and utilized to increase the useful output of the power tube.

In Fig. 5 is shown an embodiment of the present invention in which only two windings are employed in the horizontal deflection circuit instead of the three windings illustrated in Figs. 1 through 4. For simplicity of illustration the core of Fig. 1 has not been shown in Fig. 5. However, coil $L_1$ in this latter figure corresponds to the coil $L_1$ of Figs. 1 through 4, while a further coil $L_8$ corresponds generally to coil $L_3$ previously described. Thus the coil $L_1$ is assumed to be wound around, and supported by, the leg 10 of Figs. 1 through 4, while the coil $L_8$ is similarly assumed to be wound around and supported by the leg 20. With this in mind, no mention of the actual core structure will be given in connection with the description of Fig. 5. It may be further assumed that the vertical deflection components of the showing of Figs. 1 through 4 are likewise present.

The coil $L_1$ of Fig. 5 is designed to possess a relatively high impedance in the same manner as the coil $L_1$ in Figs. 1 through 4. The coil $L_8$ in Fig. 5, however, unlike the coil $L_3$ previously described, is also of high impedance. One end of coil $L_1$ is connected as shown to the anode of the horizontal power tube 14. The other end of coil $L_1$ is connected to the cathode 34 of a damping diode 36. The anode 38 of diode 36 is connected to the positive terminal 39 of the source of operating potential for tube 14.

Coil $L_1$ is also provided with a tap 40 from which a connnection is made to the upper terminal of coil $L_8$, as illustrated. This tap 40 in effect divides the coil $L_1$ into two portions, the upper portion in the drawing being identified by the reference character *a*, and the lower portion being identified in a similar manner by the reference character *b*. Coil $L_8$ is similarly provided with a tap 42 which divides the coil into two portions respectively identified by the reference characters *c* and *d*. The tap 42 on coil $L_8$ is connected, as illustrated, both to the cathode 34 of diode 36 and to the lower end of the coil $L_1$. The lower end of coil $L_8$ is connected through a condenser 44 both to the anode 38 of diode 36 and to the terminal 39 of the positive potential source.

Since coil $L_1$ is effectively connnected in series with coil $L_8$ in the anode-cathode circuit of the horizontal power tube 14, it will be seen that the total impedance of these elements should be made substantially equal to the total impedance of coil $L_1$ in the embodiment of Figs. 1 through 4.

During the conduction of power tube 14, the current flowing through coil $L_1$ will produce a field in the airgap which reinforces the field produced by the flow of this same current through a coil $L_8$ so as to bring about a horizontal deflection of the cathode ray beam. Following the scanning interval, the power tube 14 is cut off, and remains cut off during the retrace period. The current in the circuit does not disappear instantaneously, however, due to the distributed capacity of the coils $L_1$ and $L_8$. This distributed capacity is, at the beginning of retrace, charged to a relatively low voltage.

The inductance of coils $L_1$ and $L_8$, together with the capacity thereacross, forms a tuned, or resonant, circuit in which high-frequency oscillations would be produced in the absence of the diode 36. These oscillations begin when the power tube 14 is cut off, and continue for substantially one-half cycle of the natural period of free oscillation of the circuit. After one-quarter cycle, the current in the coils reverses, and the oscillation is stopped after one-half cycle, near the negative current peak, by virtue of the diode 36. The voltage, however, reaches a maximum value at one-quarter cycle when the current passes through zero.

After one-half cycle, when the current through the coils $L_1$ and $L_8$ is at a negative peak, a new deflection cycle commences. The diode 36 now becomes conductive to control the rate of decay of this current in such a manner that it will combine, in known manner, with the current output of the power tube 14 to result in a linear flow of deflection current through the coils $L_1$ and $L_8$, and hence bring about a deflection of the cathode ray scanning beam which varies in a linear manner with respect to time. For a further discussion of this use of damper tubes, reference is made to a United States patent of Otto H. Schade, No. 2,382,822 granted August 14, 1945.

Since the portion $c$ of coil $L_8$ is related to the portion $d$ of that coil in the manner of an autotransformer, it follows that the regulatory action of tube 36 will be extended to include the coil $L_1$, inasmuch as the portion $b$ of coil $L_1$ and the portion $c$ of coil $L_8$ are connected in parallel. The current which flows as a result of diode conduction will then produce a proper balanced deflection field in accordance with the inductive relationships previously described for the embodiment of Figs. 1–4.

It will be seen that the D.-C. component of the power tube current in coil $L_8$ flows in an opposite direction to the D.-C. component of the damper tube current. Hence, these D.-C. components will tend substantially to cancel, leaving an effective D.-C. current to flow through coil $L_1$ alone. This is similar to the result produced in the embodiment of Figs. 1 through 4, where the D.-C. component was restricted primarily to the closed iron path of the core and produced substantially no effective field in the opening through which the cathode ray tube passes.

The flow of diode current in the circuit of Fig. 5 produces a charge on condenser 44 having the polarity indicated in the drawing. Since this condenser 44 and the source of operating potential are both connected to the anode of power tube 14 in series-aiding relation, the effective anode supply voltage of the tube will accordingly be the algebraic sum of the potential of the source 39 and the charge developed on condenser 44. The resulting increase in anode potential on power tube 14 over that of the source 39 permits the power tube to deliver an increased flow of current through the deflecting coils $L_1$ and $L_8$, and thus increases the efficiency of the circuit as well as increasing the size of the image raster scanned by the cathode ray beam. For a further discussion of the principles involved in utilizing energy thus recovered from the damper tube circuit to either increase the normal power output, or else to maintain the normal power output with a lowering of the required operating potential, reference is made to Patent No. 2,451,641, issued October 19, 1948, to Charles E. Torsch.

In order for the circuit to operate in an optimum manner, however, it is necessary that the magnitude of the average power tube current be substantially equal to the magnitude of the average diode current, so that power will not be consumed which serves no useful purpose. This result is achieved by suitably choosing the location of the point at which the cathode 34 of diode 36 is connected to the winding $L_8$. This point need not coincide with the tap 42, but in practice will fall in the same general region. Furthermore, such a connection eliminates the necessity for a D.-C. path shunting the condenser 44, since the average power tube and diode currents, being not only equal in magnitude but also opposite in polarity, tend to balance one another.

Figure 6:
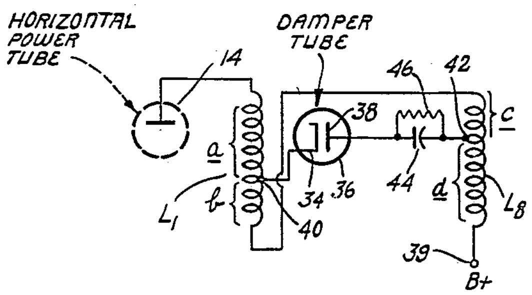
Fig. 6 shows a further embodiment of the invention in which the damping tube current flow in the two deflecting coils is automatically balanced.

In Fig. 6 is shown a further embodiment of the invention in which a pair of series-connected high-impedance windings are employed as in Fig. 5. In the showing of Fig. 6, however, the lower end of the coil $L_1$ is connected directly to the upper end of the coil $L_8$. The tap 40 on coil $L_1$ is then connected to the cathode 34 of diode 36, while the anode 38 of the diode is connected through the parallel combination of condenser 44 and a resistor 46 to the tap 42 on coil $L_8$. The principal advantage to be derived from the circuit of Fig. 6 is that the portion $b$ of coil $L_1$, as well as the portion $c$ of coil $L_8$, are both included directly in the diode circuit. That is, the diode current flows in series through these two coil portions. Accordingly, the number of turns in each of the coil portions may be so selected that the respective deflecting fiields produced by the flow of diode current will be substantially equal. The power tube current, on the other hand, will flow through the entire winding $L_1$ and also through the entire winding $L_8$. Hence the coils $L_1$ and $L_8$ may also be so chosen that the deflection produced by the flow of power tube current will also be in exact balance.

In the circuit of Fig. 6, however, it will be seen that the D.-C. component of the deflecting field is not removed from the coil $L_8$ as is the case in the circuit of Fig. 5. Furthermore, the voltage on the anode of the power tube 14 is that provided by the operating potential source 39 alone, and is not increased by the charge developed on condenser 44 during the conduction of diode 36.

Figure 7:
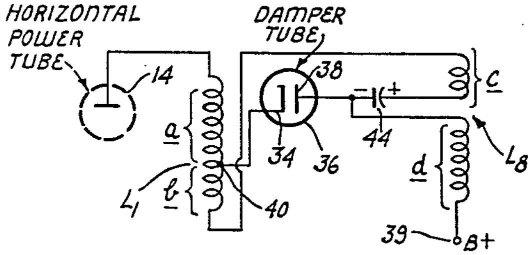
Fig. 7 is a modification of Fig. 6 to incorporate the power recovery feature therein.

Fig. 7 shows one possible manner in which the charge on condenser 44 in the circuit of Fig. 6 may be employed to provide voltage "boost" as in the circuit of Fig. 5. In Fig. 7 the coil $L_8$ is split at the tap 42, with the upper portion $c$ remaining connected to the capacitor 44 as in Fig. 6. The resistor 46 is omitted (see Fig. 5) under conditions of D.-C. current balance. The upper end of the coil portion $d$, however, instead of being joined to the right-hand plate of the condenser 44 on which the positive charge is developed, is instead connected to the left-hand plate of this condenser on which the negative charge appears. The anode-cathode circuit of the power tube 14 can now be traced from the terminal 39 of the positive potential source through the coil portion $d$, the condenser 44, the coil portion $c$, and the entire coil $L_1$ to the anode of tube 14. The polarity of the voltages are such that they are additively in series, and hence they provide an increased operating potential for the power tube 14 in the manner discussed in connection with Fig. 5.

Figure 8:
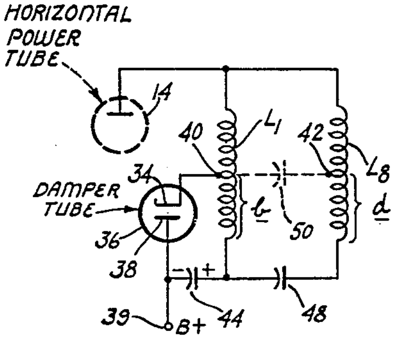
Fig. 8 illustrates a further embodiment of the invention in which the two deflecting coils are connected in parallel rather than in series, while retaining the power recovery feature mentioned above.

Referring now to Fig. 8, in which a still further embodiment of the invention is illustrated, the coils $L_1$ and $L_8$ are shown as being connected in parallel relation, rather than in series as is the case in Figs. 5, 6 and 7. The upper ends of both windings are connected to the anode of the power tube, while the lower end of coil $L_1$ is connected to the terminal 39 of the operating potential source through the condenser 44. The diode 36 has its cathode 34 connected to the tap 40, and its anode 38 connected both to the source terminal 39 and also to that plate of condenser 44 on which a negative charge is developed during the time that diode 36 is conductive. The lower end of coil $L_8$ is connected to the lower end of coil $L_1$ through a further condenser 48.

It will now be seen that during the operation of the circuit of Fig. 8 the alternating current output of the power output tube 14 is divided equally between the coils $L_1$ and $L_8$, since the condenser 48 is chosen to be of such capacity that it offers negligible resistance at scanning frequencies. Due to this condenser 48, however, the D.-C. component of the output of the power tube 14 is prevented from travelling in coil $L_8$, and flows through coil $L_1$ alone. In order for the diode current to be of maximum effectiveness in producing a balanced deflecting field, a connection may be made between the taps 40 and 42 which includes the still further condenser 50 shown in dotted lines. When this condenser 50 is employed, the diode current will flow equally through the portion $b$ of coil $L_1$ and through the portion $d$ of coil $L_3$, and hence will preserve the balance required for optimum deflection of the cathode ray beam.

Figure 9:
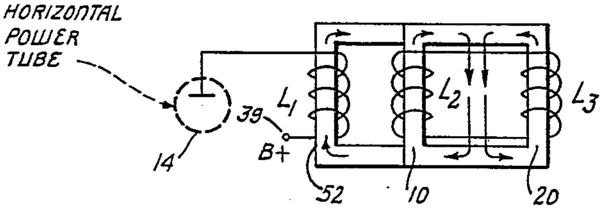
Fig. 9 is a modification of the embodiment of the invention shown in Figs. 1 through 4, wherein the transformer core is provided with an additional leg on which the primary coil is wound.

In Fig. 9 is shown a modification of that embodiment of the invention illustrated in Figs. 1 through 4. While in these last-mentioned figures the core element 12 is of rectangular shape and has two vertical legs 10 and 20, the modification of Fig. 9 includes a third vertical leg 52 forming an extension of the core element 12 and lying in parallel relation to the legs 10 and 20. This additional vertical leg 52 carries the high-impedance coil $L_1$ of Figs. 1 through 4 which lies in the anode-cathode circuit of the power tube 14. The vertical leg 10, which in the earlier described embodiment carried both coils $L_1$ and $L_2$, now supports only the low-impedance coil $L_2$ in the manner illustrated. The electromagnetic fields produced by the coils $L_1$ and $L_2$ are similar in the case of Fig. 9 to the fields produced by these same coils in the showing of Figs. 1 through 4. In other words, the flux produced by coil $L_3$ is substantially equal to that resulting from the combined fluxes produced by coils $L_1$ and $L_2$. Also, as in the case of the earlier embodiment, the D.-C. component of the deflecting field is restricted for the most part to the closed iron path of the core, and has negligible effect in the central opening through which the cathode ray tube neck passes.

It will be readily apparent that one or more additional windings may be employed in connection with any of the embodiments illustrated so as to permit the voltage developed across the horizontal deflecting coils to be stepped up to a point where it is suitable for rectification and subsequent employment as the accelerating potential for the cathode ray tube. This permits the combined deflection yoke and output transformer set forth in the present disclosure to be used in systems incorporating a so-called surge type, or flyback, high voltage supply.

Having thus described my invention, I claim:

1. Apparatus for electromagnetically deflecting the beam of a cathode ray tube so that the beam will effect a line-by-line scanning of an image raster area on the face of said cathode ray tube, said apparatus comprising a magnetic core structure adapted to encircle the neck portion of said cathode ray tube, a pair of coils wound on said core structure and arranged to lie on opposite sides of the said cathode ray tube neck portion, a source of sawtooth current, a circuit for causing said sawtooth current to flow in series through at least a portion of each coil of said pair, a diode connected in parallel with at least a portion of one of said coils so as to rectify the reactive energy developed in said circuit following the line-scanning interval in each deflection cycle, and means for coupling together said pair of coils so as to produce an electromagnetic field around the other of said coils the strength of which at any instant during the scanning action of said cathode ray beam is substantially equal to the field around said one coil.

2. The combination of claim 1, further comprising an energy-storage device in series with said diode, and means for connecting said energy-storage device to said source of sawtooth current so that the energy stored in said device is effective to increase the sawtooth amplitude.

3. In a cathode ray beam deflection circuit, a source of operating potential, a power tube having an output electrode, a pair of deflecting coils, a connection between one end of one of said coils and the output electrode of said power tube, a diode, a connection between the other end of said one coil and the cathode of said diode, means for connecting the anode of said diode to one terminal of the said source of operating potential, a connection between one end of the remaining coil and a tap on said one coil, a condenser, a connection between the other end of said remaining coil through said condenser to the anode of said diode, and means for connecting the cathode of said diode to a tap on said remaining coil.

4. In an electron beam deflection system for a cathode ray tube: a core member of ferromagnetic material enclosing an aperture adapted to receive a beam traversed portion of said cathode ray tube; first and second coils wound about portions of said core on opposite sides of said aperture, said first coil being responsive to a current of first predetermined polarity supplied thereto to produce a magnetic flux encircling said aperture entirely within said core and a magnetic flux traversing said aperture, said second coil being responsive to a current of second predetermined polarity supplied thereto to produce a magnetic flux encircling said aperture entirely within said core and opposing said aperture encircling flux produced by said first coil and to produce a magnetic flux traversing said aperture and reinforcing said aperture traversing flux produced by said first coil; means for supplying to said first coil current of said first polarity comprising a unidirectional component and an alternating component, thereby to produce said aperture encircling flux and said aperture traversing flux, each with an undesired unidirectional component and with a desired alternating component; a coupling between said first and second coils responsive only to said alternating current component in said first coil to supply only an alternating current of said second polarity to said second coil, thereby to produce only an alternating component of said opposing, aperture encircling flux and only an alternating component of said reinforcing, aperture traversing flux, said unidirectional components of flux produced by said first coil remaining substantially unaffected.

5. In an electron beam deflection system for a cathode ray tube: a core member of ferromagnetic material enclosing an aperture adapted to receive a beam traversed portion of said cathode ray tube; first and second coils wound about portions of said core on opposite sides of said aperture, said first coil being responsive to a current of first predetermined polarity supplied thereto to produce a magnetic flux encircling said aperture entirely within said core and a magnetic flux traversing said aperture, said second coil being responsive to a current of second predetermined polarity supplied thereto to produce a magnetic flux encircling said aperture entirely within said core and opposing said aperture encircling flux produced by said first coil and to produce a magnetic flux traversing said aperture and reinforcing said aperture traversing flux produced by said first coil; means for supplying to said first coil current of said first polarity comprising a unidirectional component and an alternating component, thereby to produce said aperture encircling flux and said aperture traversing flux, each with an undesired unidirectional component and with a desired alternating component; an inductive coupling between said first and second coils responsive only to said alternating current component in said first coil to supply only an alternating current of said second polarity to said second coil, thereby to produce only an alternating component of said opposing, aperture encircling flux and only an alternating component of said reinforcing, aperture traversing flux, said unidirectional components of flux produced by said first coil remaining substantially unaffected.

6. In an electron beam deflection system for a cathode ray tube: a core member of ferromagnetic material enclosing an aperture adapted to receive a beam traversed portion of said cathode ray tube; first and second coils wound about portions of said core on opposite sides of said aperture, said first coil being responsive to a current of first predetermined polarity supplied thereto to produce a magnetic flux encircling said aperture entirely within said core and a magnetic flux traversing said aperture, said second coil being responsive to a current of second predetermined polarity supplied thereto to produce a magnetic flux encircling said aperture entirely within said core and opposing said aperture encircling flux produced by said first coil and to produce a magnetic flux traversing said aperture and reinforcing said aperture traversing flux produced by said first coil; means for supplying to said first coil current of said first polarity comprising a unidirectional component and an alternating component, thereby to produce said aperture encircling flux and said aperture traversing flux, each with an undesired unidirectional component and with a desired alternating component; a capacitive coupling between said first and second coils responsive only to said alternating current component in said first coil to supply only an alternating current of said second polarity to said second coil, thereby to produce only an alternating component of said opposing, aperture encircling flux and only an alternating component of said reinforcing, aperture traversing flux, said unidirectional components of flux produced by said first coil remaining substantially unaffected.

ROBERT C. MOORE.

REFERENCES CITED

The following references are of record in the file of this patent:

UNITED STATES PATENTS

| Number | Name | Date |
|---|---|---|
| 2,185,134 | Schlesinger | Dec. 26, 1939 |
| 2,383,308 | Hansen | Aug. 21, 1945 |
| 2,393,601 | Baldwin, Jr. | Jan. 29, 1946 |
| 2,395,966 | Goldberg | Mar. 5, 1946 |
| 2,414,939 | Fitch | Jan. 28, 1947 |
| 2,443,032 | Gethmann | June 8, 1948 |
| 2,451,641 | Torsch | Oct. 19, 1948 |